Sept. 6, 1949.  P. SIEVER  2,481,167
THROTTLE CONTROL DEVICE
Filed May 20, 1948
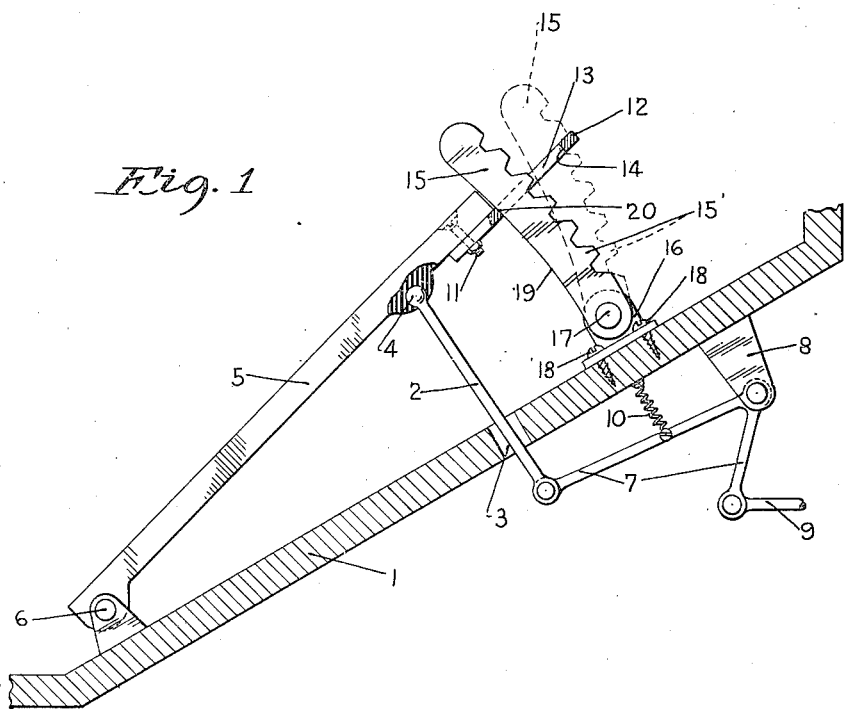
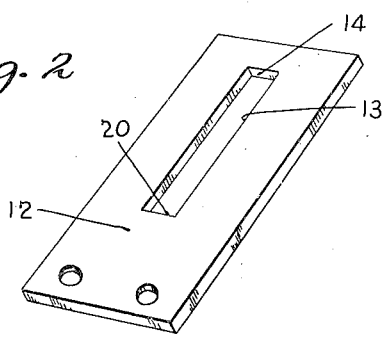
Inventor
Paul Siever
By Attorneys
Merchant & Merchant Patented Sept. 6, 1949

2,481,167

UNITED STATES PATENT OFFICE 2,481,167

THROTTLE CONTROL DEVICE

Paul Siever, Minneapolis, Minn.

Application May 20, 1948, Serial No. 28,262

5 Claims. (Cl. 74—534)

My invention relates to improvements in control mechanisms for motor vehicles and has particular reference to an accelerator control device.

An object of my invention is to provide a simple, inexpensive, and practical device which may be applied to various standard types of motor vehicles and in which improved means are provided for releasably maintaining the accelerator in various adjusted positions so that a substantially constant speed may be maintained while the foot of the vehicle operator is temporarily removed from the accelerator pedal, for any one of a number of reasons.

Another important object of my invention is the provision of a device in which the mechanism for maintaining the accelerator pedal in a given adjusted position is normally held inoperative under the action of gravity, so as to permit normal use of the accelerator pedal, and to require manual setting of the locking mechanism.

Another important object of my invention is the provision of a novel structure in which the accelerator may be manually set in a desired set position by forward sliding movement of the operator's foot upon the foot pedal so as to engage an upstanding ratchet element associated with the forward end of said foot pedal, which ratchet element will, under the action of gravity, be rendered inoperative when the foot pedal is depressed beyond the set position.

A still further object of my invention is the provision of a structure for accomplishing the above objects which is extremely inexpensive to produce, easy to install as an accessory to any standard vehicle, which is fool-proof in operation and extremely durable in use.

The above and still further highly important objects and advantages of my invention will become apparent from the following detailed specification, appended claims, and attached drawings.

Referring to the drawings, wherein like characters indicate like parts throughout the several views:

Fig. 1 is a view in cross section of the floor board of a driver's compartment of a motor vehicle, showing my device in side elevation attached thereto; and Fig. 2 is a view in perspective of the pawl element of my invention.

Referring with greater particularity to the drawings, the numeral 1 indicates the normally slanting portion of a floor board of a motor vehicle; and the numeral 2 indicates a conventional accelerator rod which projects upwardly through an opening 3 therein. Rod 2 terminates at its free end in a head 4 which is adapted to be engaged by the underside of a foot pedal 5 which is pivotally secured adjacent its lower or rear end to the floor board 1, as indicated at 6. Beneath the floor board, the accelerator rod 2 is connected to one end of a bell crank 7 which has its intermediate portion pivoted to a bracket 8 secured to the floor board 1. At its opposite end, the bell crank 7 has pivotal connection with an extension rod 9 which leads to the throttle of a carburetor not shown. As shown, a coil extension spring 10 is interposed between the floor board 1 and the bell crank 7, whereby to bias the accelerator rod 2 in an upward direction. Secured to the forward end of the foot pedal 5 by means of nut-equipped screws or the like 11 is a rectangular metallic plate 12. The plate 12 extends longitudinally forwardly of the pedal 5 and is provided with a longitudinally-extending rectangular slot 13, the forward end 14 of which defines a pawl element.

A ratchet element preferably in the nature of a segmental toothed bar 15 has its lower end pivotally mounted to a bracket 16, as indicated at 17. The bracket 16 is securely fastened to the floor board 1 by means of screws or the like 18. The bracket 16 is so disposed with respect to the plate 12 that the ratchet element or bar 15 extends upwardly and rearwardly through the slot 13 with the teeth 15' of the ratchet element 15 facing the pawl element 14. The rearward inclination of the bar 15 is such that the bar is gravity biased away from engagement with the pawl element 14. As shown, the side of the bar 15, opposite the teeth 15', presents a smooth edge or surface 19 which normally rides against the end 20 of the slot 13 opposite the pawl element 14, whereby to allow free pivotal movements of the foot pedal 5.

When it is desired to maintain the foot pedal 5 in a pre-determined set position, the operator of the vehicle depresses the pedal 5 to the extent desired. The operator then slides his foot forwardly upon the foot pedal 5 and moves the toothed bar 15 from the full line position of Fig. 1 to the dotted line pawl element-engaging position thereof. The operator may then remove his foot from the pedal 5 altogether, upward bias of the spring 10 upon the bell crank 10, accelerator rod 2 and foot pedal 5 being sufficient to frictionally hold the toothed bar 15 in locking engagement with the pawl element 14. When it is desired to render the device inoperative, for the purpose of decelerating the vehicle or to resume manual control of the accelerator, it is but necessary to depress the foot pedal 5 sufficiently to release the ratchet element bar 15 from frictional engagement with the pawl element 14. The ratchet element 15 will, under bias of gravity, rock or swing to the full line position of Fig. 1 where it will remain until the operator desires to reset the same. It will be understood, however, that the downward pressure on the foot pedal 5, necessary to cause disengagement of the ratchet element 15 from the pawl element 14, is very slight and that, when the operator wishes to decelerate, there will be no appreciable increase in speed resulting from this slight depression of the foot pedal 5 necessary to release the ratchet element 15.

My invention has been thoroughly tested and found to be thoroughly adequate for the accomplishment of the objectives set forth; and, while I have disclosed a single embodiment of my invention, it will be understood that the same is capable of modification without departure from the scope and spirit of the invention as defined by the claims.

What I claim is:

1. In a device of the class described, a foot pedal adapted to have its rear end portion pivotally secured to the floor boards of a vehicle in a position to engage and actuate an accelerator rod projecting upwardly through the floor boards at substantially right angles thereto, and spring means adapted to bias the free end of said foot pedal and the projected end of said throttle lever outwardly with respect to said floor board, said pedal forwardly of said pivot being provided with an elongated longitudinally-extended slot the forward end of which is in the nature of a pawl element, a ratchet element adapted to be pivotally secured to said floor board for rocking movements in said slot, said ratchet element having teeth on its forward edge adapted to engage said pawl element to maintain said pedal in a set depressed position but being normally rearwardly biased whereby said teeth are out of operative engagement with said pawl element.

2. In a device of the class described, a foot pedal adapted to have its rear end portion pivotally secured to the floor boards of a vehicle in a position to engage and actuate an accelerator rod projecting upwardly through the floor boards at substantially right angles thereto, and spring means adapted to bias the free end of said foot pedal and the projected end of said throttle lever outwardly with respect to said floor board, said pedal adjacent its free end being provided with an elongated longitudinally-extended slot the forward end of which is in the nature of a pawl element, a ratchet element adapted to be pivotally secured to said floor board for limited rocking movements in said slot, said ratchet element having teeth on its forward edge adapted to engage said pawl element to maintain said pedal in a set depressed position but being normally rearwardly biased whereby said teeth are out of operative engagement with said pawl element.

3. The structure defined in claim 1 in which said ratchet element is gravity biased in a direction away from said pawl element.

4. In a device of the class described, a foot pedal adapted to have its rear end portion pivotally secured to the floor boards of a vehicle in a position to engage and actuate an accelerator rod projecting upwardly through the floor boards at substantially right angles thereto, spring means biasing the free end of said foot pedal and the projected end of said throttle lever outwardly with respect to said floor boards, a pawl element on said foot pedal forwardly of said pivot, said pawl element being in the nature of a slotted plate adapted to be secured to the forward end of the foot pedal with the slot thereof extending longitudinally of said foot pedal, a ratchet element adapted to be pivotally secured to said floor boards for rocking movements into and out of engagement with said pawl element and normally biased out of engagement therewith, and means limiting the rocking movements of said ratchet element in one direction.

5. In a device of the class described, a foot pedal adapted to have its rear end portion pivotally secured to the floor boards of a vehicle in a position to engage and actuate an accelerator rod projecting upwardly through the floor boards at substantially right angles thereto, spring means biasing the free end of said foot pedal and the projected end of said throttle lever outwardly with respect to said floor board, a pawl element on said foot pedal forwardly of said pivot, a ratchet element adapted to be pivotally secured to said floor boards for rocking movements into and out of engagement with said pawl element and normally biased out of engagement therewith, and means limiting the rocking movements of said ratchet element in one direction, the rocking movements of said ratchet being in the plane parallel to the plane of movement of said foot pedal, said ratchet element being gravity biased away from said ball element.

PAUL SIEVER.

REFERENCES CITED

The following references are of record in the file of this patent:

UNITED STATES PATENTS

| Number | Name | Date |
|---|---|---|
| 1,193,154 | Kirchoff | Aug. 1, 1916 |
| 1,523,858 | Buller | Jan. 20, 1925 |
| 1,553,280 | Wright | Sept. 8, 1925 |
| 1,651,871 | Drews | Dec. 6, 1927 |
| 2,312,031 | Coutcher | Feb. 23, 1943 |